(12) United States Patent
Henning et al.

(10) Patent No.: US 9,334,394 B1
(45) Date of Patent: May 10, 2016

(54) FARNESENE RESINS, RUBBER COMPOSITIONS, AND TIRE COMPOSITIONS

(71) Applicant: Fina Technology, Inc., Houston, TX (US)

(72) Inventors: Steven K. Henning, Downingtown, PA (US); Keith A. Nelson, Exton, PA (US); Jean-Marc Monsallier, Martin Longueau (FR); Fabien Salort, Balagny sur Therain (FR)

(73) Assignee: Fina Technology, Inc., Houston, TX (US)

( * ) Notice: Subject to any disclaimer, the term of this patent is extended or adjusted under 35 U.S.C. 154(b) by 0 days.

(21) Appl. No.: 14/729,437

(22) Filed: Jun. 3, 2015

(51) Int. Cl.
*C08F 36/22* (2006.01)
*C08L 9/06* (2006.01)

(52) U.S. Cl.
CPC . *C08L 9/06* (2013.01); *C08F 36/22* (2013.01); *C08L 2205/02* (2013.01); *C08L 2205/03* (2013.01)

(58) Field of Classification Search
CPC ...................................................... C08F 36/22
See application file for complete search history.

(56) References Cited

U.S. PATENT DOCUMENTS

| | | | |
|---|---|---|---|
| 2,940,830 | A | 6/1960 | Thornhill |
| 4,514,554 | A | 4/1985 | Hughes |
| 5,877,249 | A | 3/1999 | Lambotte |
| 6,525,133 | B1 | 2/2003 | Wideman |
| 7,411,018 | B2 | 8/2008 | Appel |
| 8,048,976 | B2 | 11/2011 | McPhee |
| 8,217,128 | B2 | 7/2012 | McPhee |
| 8,592,543 | B2 | 11/2013 | McPhee |
| 8,703,263 | B2 * | 4/2014 | Goubard .................... 428/195.1 |
| 8,785,542 | B2 | 7/2014 | Kuwahara |
| 8,912,269 | B2 | 12/2014 | Kuwahara |
| 2011/0151253 | A1 * | 6/2011 | Laferte ................ C08G 18/718 428/355 CN |
| 2014/0296373 | A1 | 10/2014 | Mabuchi |
| 2014/0357824 | A1 | 12/2014 | Washizu |
| 2014/0371415 | A1 | 12/2014 | Washizu |
| 2015/0025193 | A1 | 1/2015 | Doolan |
| 2015/0031839 | A1 | 1/2015 | Washizu |
| 2015/0038657 | A1 | 2/2015 | Washizu |
| 2015/0047403 | A1 | 2/2015 | Imai |
| 2015/0051332 | A1 | 2/2015 | Koda |
| 2015/0057392 | A1 | 2/2015 | Koda |
| 2015/0087763 | A1 | 3/2015 | Koda |

FOREIGN PATENT DOCUMENTS

| | | |
|---|---|---|
| EP | 2716667 | 4/2014 |
| EP | 2783880 | 10/2014 |
| EP | 2835383 | 2/2015 |
| EP | 2835386 | 2/2015 |
| EP | 2835387 | 2/2015 |
| JP | 2014208796 | 11/2014 |
| WO | 2013047347 | 4/2013 |
| WO | 2013047348 | 4/2013 |
| WO | 2013109727 | 7/2013 |
| WO | 2013115010 | 8/2013 |
| WO | 2013115011 | 8/2013 |
| WO | 2013125496 | 8/2013 |
| WO | 2013126129 | 8/2013 |
| WO | 2013128977 | 9/2013 |
| WO | 2013132905 | 9/2013 |
| WO | 2013151067 | 10/2013 |
| WO | 2013151068 | 10/2013 |
| WO | 2013151069 | 10/2013 |
| WO | 2014157624 | 10/2014 |

OTHER PUBLICATIONS

Brunauer, S. et al., "Adsorption of Gases in Multimolecular Layers" J. Am. Chem. Soc., 1938, vol. 60, No. 2, pp. 309-319.

* cited by examiner

*Primary Examiner* — Robert Harlan
(74) *Attorney, Agent, or Firm* — Albert Shung

(57) ABSTRACT

A farnesene polymer is provided having a glass transition temperature greater than zero degrees Celsius that is obtained by combining a farnesene monomer and a solvent and optionally adding one or more vinyl aromatic comonomers to provide a monomer feed and polymerizing the monomer feed with a Friedel-Crafts catalyst. The farnesene polymer may be included as a resin in a rubber composition for tire applications.

22 Claims, 1 Drawing Sheet

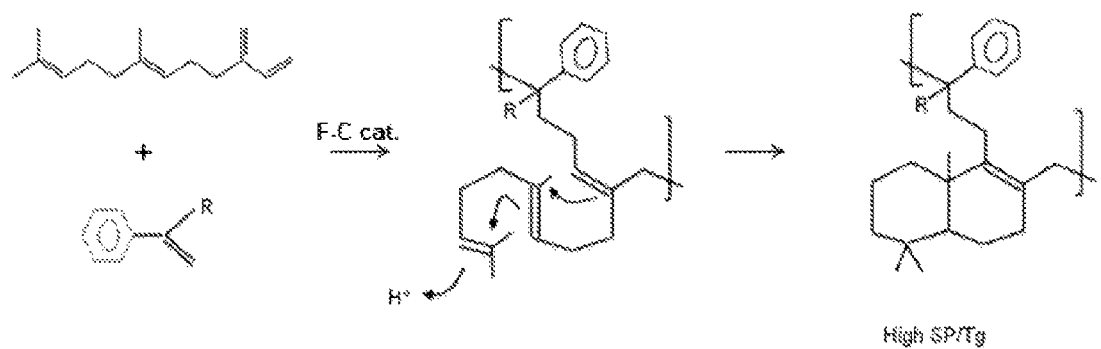

FARNESENE RESINS, RUBBER COMPOSITIONS, AND TIRE COMPOSITIONS

FIELD OF THE INVENTION

The invention relates to rubber compositions comprising a synthetic or natural elastomer, filler or fillers, and a resin useful in tire components (e.g. tire treads). The resin includes low molecular weight farnesene-based homopolymers or copolymers prepared using a Friedel-Crafts catalyst and having a glass transition temperature ("Tg") greater than zero degrees Celsius.

BACKGROUND

Tires typically include treads made of a rubber composition. The rubber comprises various elastomers that are often a combination of cis 1,4-polybutadiene, styrene/butadiene copolymer elastomers, and/or natural rubber, although minor amounts of other elastomers, including, for example, cis 1,4-polyisoprene, isoprene/butadiene and 3,4-polyisoprene, may also be present. When producing rubber compositions for tires, it is common to utilize fillers for the purpose of reducing costs by replacing higher priced constituents of the rubber composition while at the same time imparting some additional functionality or improved properties to the final rubber product. The fillers are conventionally particulate reinforcing fillers of which carbon black and/or aggregates of a synthetic silica such as a precipitated silica are the most common.

The demand for increased traction while maintaining other tire performance properties has been a major focus of tread formulating strategy. The use of low molecular weight oligomers in place of aromatic process oils has also been a central theme. While the use of extending process oils are an inexpensive way to provide good processing and cured rubber performance, their use is decreasing due to raw material availability and recent legislation that requires carcinogenic labeling of certain aromatic oil grades. There is therefore a need for resins that are suitable aromatic oil replacements that are compatible in tire formulations and impart improved physical performance characteristics in the tire.

Resins derived from aliphatic monomers may impart a degree of compatibility with common tire elastomers. However, aliphatic diene monomers have limitations of the Tg achievable using anionic or other polymerization techniques. The challenge is to synthesize compositions with high Tgs yet maintain good compatibility.

SUMMARY OF THE INVENTION

In a first aspect of the invention, a method of manufacturing a farnesene polymer having a glass transition temperature greater than zero degrees Celsius is provided comprising combining a farnesene monomer and a solvent and optionally adding one or more monomers selected from the group consisting of vinyl aromatics, to provide a monomer feed, and polymerizing the monomer feed by combining the monomer feed with a Friedel-Crafts catalyst in a vessel.

In a second aspect of the invention, a rubber composition is provided comprising at least one elastomer selected from synthetic and natural elastomers, a filler, and a farnesene polymer having a Tg greater than zero degrees Celsius.

In a third aspect of the present invention, a tire is provided in which at least a portion of the tire comprises a rubber composition that includes a farnesene polymer having a Tg greater than zero degrees Celsius.

BRIEF DESCRIPTION OF THE FIGURE

FIG. 1 is an example of a cyclization reaction that may occur for a farnesene-based copolymer according to a method of the present invention.

DETAILED DESCRIPTION OF THE INVENTION

It has been found that polymerizing a farnesene monomer according to the present invention by using a strong Lewis acid, such as a Friedel-Crafts catalyst, cyclization of the polymer competes with monomer addition and results in low molecular weight resin having a high Tg. As used throughout the specification and the claims, "Friedel-Crafts catalyst" means a strong Lewis acid and the complexes thereof that function as a polymerization initiator. Resins made according to the present invention differ from previous farnesene-based polymers in that the methods generally used to provide the previous polymer resins were either anionic or free radical polymerization, both of which lead to very low Tg materials. When used as additives in rubber compounds for tire tread applications, the high Tg farnesene resins produce a much more desirable performance balance (traction/rolling resistance) than the low Tg farnesene resins.

While not wishing to be bound to theory, it is believed that the high Tgs attained for the resins according to the present invention are a consequence of the highly cyclic molecular structure that results from using a Friedel-Crafts catalyst as the polymerization initiator. For example, referring to FIG. 1, a polymerization reaction of the monomers farnesene and styrene using a Friedel-Crafts catalyst as the polymerization initiator likely causes intra-molecular reaction of the olefins in what would have been acyclic pendant side chains derived from the farnesene monomer. The cyclization depicted in FIG. 1 is one example of cyclization that may potentially occur.

It is one aspect of the present invention to provide a tire in which at least a portion (e.g. a tire-tread) is made from a rubber composition comprising a low molecular weight farnesene-based homopolymer or copolymer resin prepared by a Friedel-Crafts catalyst having a glass transition temperature greater than zero degrees Celsius. Tires that include the farnesene resins according to the present invention exhibit improved traction properties when compared to tires containing farnesene-based resins prepared by other polymerization methods. Therefore, it is believed that the use of Friedel-Crafts catalysts results in a polymer having a cyclized structure and that this imparts very high Tgs to the resin that are otherwise unattainable using other polymerization methods. The Tg of the polymer and compatibility of the farnesene-based resins with elastomers in the rubber composition may be further modified by copolymerizing vinyl aromatic monomers with the farnesene monomer. Low molecular weight resins based on vinyl aromatic monomers are an attractive alternative as they can improve tire properties when compared to aromatic process oils, largely because they can be prepared to have a wide range of Tgs. However, it is preferred that the resins according to the present invention are derived from a monomer feed that is primarily composed of farnesene.

As explained above, it is believed that maximizing the cyclization of the resin molecule is advantageous to the ability to provide a resin with a high Tg, which imparts beneficial physical functionality to rubber compositions intended for tire applications. Farnesene is particularly useful in that the monomer forms cyclic structures via a "back biting" mechanism where the growing end of the resin molecule attacks a double bond in the same molecule. This mechanism occurs in the presence of strong Lewis acids. The resulting aliphatic resins have high Tgs yet remain compatible with common tire elastomers. In addition, other vinyl aromatic monomers can be included to form copolymers with modified properties and compatibility.

The low molecular weight farnesene-based homopolymers or copolymer resins prepared by a Friedel-Crafts catalyst can be homopolymers of farnesene and copolymers of farnesene and vinyl aromatic monomers. Small amounts of monoolefins may also be included for the purpose of molecular weight control.

Farnesene exists in isomer forms, such as α-farnesene ((3E,7E)-3,7,11-trimethyl-1,3,6,10-dodecatetraene) and β-farnesene (7,11-dimethyl-3-methylene-1,6,10-dodecatriene). As used in the specification and in the claims, "farnesene" means (E)-β-farnesene having the following structure:

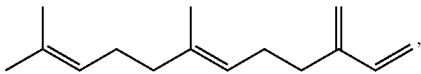

as well (E)-β-farnesene in which one or more hydrogen atoms have been replaced by another atom or group of atoms (i.e. substituted).

The farnesene monomer used to produce various embodiments of the resin according to the present invention may be prepared by chemical synthesis from petroleum resources, extracted from insects, such as Aphididae, or plants. Therefore, an advantage of the present invention is that the resin may be derived from a monomer obtained via a renewable resource. It is preferably prepared by culturing a microorganism using a carbon source derived from a saccharide. The farnesene resin according to the present invention may be efficiently prepared from farnesene monomer obtained via these sources.

The saccharide used may be any of monosaccharides, disaccharides, and polysaccharides, or may be a combination thereof. Examples of monosaccharides include glucose, galactose, mannose, fructose, and ribose. Examples of disaccharides include sucrose, lactose, maltose, trehalose, and cellobiose. Examples of polysaccharides include starch, glycogen, cellulose, and chitin.

The cultured microorganism that consumes the carbon source may be any microorganism capable of producing farnesene through culturing. Examples thereof include eukaryotes, bacteria, and archaebacteria. Examples of eukaryotes include yeast and plants. The microorganism may be a transformant obtained by introducing a foreign gene into a host microorganism. The foreign gene is not particularly limited, and it is preferably a foreign gene involved in the production of farnesene because it can improve the efficiency of producing farnesene.

In the case of recovering farnesene from the cultured microorganism, the microorganism may be collected by centrifugation and disrupted, and then farnesene can be extracted from the disrupted solution with a solvent. Such solvent extraction may appropriately be combined with any known purification process such as distillation.

As previously noted, resins according to the present invention may be low molecular weight copolymers that include one or more vinyl aromatic comonomers. Examples of vinyl aromatic comonomers include, but are not limited to, styrene, alpha-methyl styrene, 2-methyl styrene, 3-methyl styrene, 4-methyl styrene, 44-butyl styrene, 4-cyclohexyl styrene, 4-dodecyl styrene, 2,4-diisopropyl styrene, 2,4,6-trimethyl styrene, 2-ethyl-4-benzyl styrene, 4-(phenyl butyl)styrene, 1-vinyl naphthalene, 2-vinyl naphthalene, vinyl anthracene, 4-methoxy styrene, monochlorostyrene, dichlorostyrene, divinyl benzene, indene, and methyl indene. Styrene, alpha-methyl styrene and 4-methyl styrene are preferred.

In one embodiment of the present invention, at least one of $AlCl_3$ and $BF_3$ may be used to polymerize a monomer feed comprising farnesene monomer and a comonomer in which the comonomer content of the monomer feed is ≤90 mol. %, ≤50 mol. %, ≤45 mol. %, ≤40 mol. %, ≤35 mol. %, or ≤30 mol. %, more preferably ≤25 mol. %, ≤20 mol. %, ≤15 mol. %, ≤10 mol, %, or ≤5 mol. %, based on the total moles of the monomer in the monomer feed. In another embodiment of the present invention, $BF_3$ may be used to polymerize a monomer feed comprising farnesene monomer and a comonomer, in which the comonomer content of the monomer feed is 75 mol. %, ?_ 80 mol. %, or 85 mol. %, or more preferably >90 mol. %, based on the total moles of the monomer in the monomer feed.

According to other embodiments of the present invention, mono-olefin molecular weight regulators may also be polymerized with the farnesene monomers used to produce the resins. The mono-olefins include, but are not limited to, 2-methyl-2-butene, isobutylene, and cyclopentane.

Friedel-Crafts catalysts are strong Lewis acid catalysts, as explained above, which polymerize monomers via a cationic reaction mechanism. According to various embodiments of the present invention, examples of Friedel-Crafts catalysts that may be used to polymerize a monomer feed comprising farnesene to produce a resin having a glass transition temperature greater than zero degrees Celsius include, but are not limited to, boron trifluoride, aluminum trichloride, tin tetrachloride-titanium trichloride, titanium tetrachloride, iron chloride(III), aluminum tri-bromide, dichloromonoethyl aluminum, and complexes thereof, such as boron trifluoride-phenol complex, boron trifluoride-ethanol complex, boron trifluoride-ether complex and the like, especially, boron trifluoride-phenol complex and boron trifluoride-ethanol complex. The Friedel-Craft catalyst may also include a liquid aluminum chloride/hydrochloric acid/substituted aromatics complex, the aromatic being for example o-xylene, mesitylene, ethyl benzene, isopropyl benzene, and the like, such as short or long chain alkylbenzenes. The alkyl chain may be linear or branched and may vary from 2 to 30 carbon atoms. Acidic liquid $AlCl_3$ obtained as by-products during the alkylation of benzene or any other substituted aromatics (toluene, xylenes) with branched chain olefins may also be used. The branched chain olefins may be produced via the boron trifluoride oligomerization of propylene and fractionation (e.g. $C_{12}$ olefins or $C_{24}$ olefins may be alkylated with aromatics).

The Friedel-Crafts catalyst most preferred are $AlCl_3$ and $BF_3$. The resins described herein may be prepared by a continuous solution polymerization process wherein the Friedel-Craft catalyst, monomers, and a suitable aromatic or aliphatic hydrocarbon solvent, such as, for example, toluene, xylene, or heptane, are continuously added to a reactor vessel to form the desired homopolymer or copolymer. Methods of producing the farnesene polymer according to the present invention include combining a farnesene monomer and a solvent and optionally adding one or more monomers selected from the group consisting of vinyl aromatics, to provide a monomer feed, and polymerizing the monomer feed by combining the monomer feed with a Friedel-Crafts catalyst in a vessel. Polymerizing the monomer feed may comprise continuously feeding the monomer feed and the Friedel-Crafts catalyst to the vessel. Preferably, the flow rate of monomer feed and Friedel- Crafts catalyst is controlled, such that the catalyst feed is about 0.01 to 20 wt. % based on the combined mass flow rate of the monomer, more preferably 0.1 to 5 wt. %, and most preferably 0.1 to 3 wt. %. The reaction temperature of the mixture in the reactor vessel is also preferably maintained at a temperature of about −10 to 50° C., more preferably 0 to 10° C., when using $BF_3$ as the Friedel-Crafts catalyst and about 10 to 60° C., more preferably 20 to 40° C., when using $AlCl_3$.

The low molecular weight farnesene-based homopolymers or copolymers of the resins according to embodiments of the present invention may have a number average molecular weight between 400 and 10,000 g/mol, preferably 400 to 2500, as measured through a gel permeation chromatograph and converted using polystyrene calibration.

It is another aspect of the present invention to provide a rubber composition comprising at least one elastomer, a filler, and a low molecular weight resin containing a farnesene derived polymer having a glass transition temperature greater than zero Celsius. The rubber composition may comprise 1-50 parts, more preferably 5-25 parts, of the farnesene derived polymer per 100 parts of the at least one elastomer. Examples of elastomers that may be included in various embodiments of the present invention include all classes of synthetic and natural rubbers, polybutadiene, polyisoprene, polystyrene-co-butadiene), poly(isoprene-co-butadiene), poly(butadiene-co-isoprene-co-styrene), butyl rubber, and ethylene-propylene-diene monomer rubber produced by a variety of solution or emulsion polymerization processes and anionic, cationic, or free-radical initiation to produce random, or block comonomer sequence distributions and low to high vinyl microstructure of the diene portion. Functionalized versions of these elastomers may also be include in the rubber compositions according to the present invention.

Examples of reinforcing fillers that may be included in the rubber compositions according to certain embodiments of the present invention include pyrogenic silica fillers and precipitated finely-divided silicas typically employed for rubber compounding. The silica filler, however, is preferably of the type obtained by precipitation from a soluble silicate, such as sodium silicate. For example, silica fillers produced according to the method described in U.S. Pat. No. 2,940,830 may be used. These precipitated, hydrated silica pigments have a $SiO_2$ content of at least 50% and usually greater than 80% by weight on an anhydrous basis. The silica filler may have an ultimate particle size in the range of from about 50 to 10,000 angstroms, preferably between 50 and 400 and, more preferably, between 100 and 300 angstroms. The silica may have an average ultimate particle size in a range of about 0.01 to 0.05 microns as determined by electron microscope, although the silica particles may even be smaller in size. The BET surface area of the filler as measured using nitrogen gas is preferably in the range of 40 to 600 square meters per gram, preferably 50 to 300 square meters per gram. The BET method of measuring surface area is described in the Journal of the American Chemical Society, Vol. 60, pages 309-319 (1938). The silica also has a dibutyl (DBP) absorption value in a range of about 200 to about 400, with a range of from about 220 to 300 being preferred.

Various commercially available silicas and carbon black may be used as reinforcing fillers in various embodiments of the present invention. For example, silicas commercially available from PPG Industries under the Hi-Sil trademark such as, for example, those with designations 210, 243, etc.; silicas available from Rhone-Poulenc, with designations of Z1165MP and Z165GR and silicas available from Degussa AG with designations VN2 and VN3, etc. The Rhone-Poulenc Z1165MP silica is a preferred silica which is reportedly characterized by having a BET surface area of about 160470 and by a DBP value of about 250-290 and by having a substantially spherical shape. Representative examples of carbon blacks include N110, N121, N220, N231, N234, N242, N293, N299, S315, N326, N330, N332, N339, N343, N347, N351, N358, N375, N539, N550, N582, N630, N642, N650, N683, N754, N762, N765, N774, N787, N907, N908, N990 and N991.

Representative reinforcing fillers may be included in rubber compositions according to various embodiments of the invention in amounts ranging from about 5 to 100 parts by weight based on 100 parts by weight of total rubber (phr). Preferably, between about 10 and 50 parts by weight of reinforcing filler is used per 100 parts of rubber.

In compounding a rubber composition containing a filler, one generally uses a coupling agent. Such coupling agents, for example, may be premixed or pre-reacted with the filler or added to the rubber mix during the rubber/filler processing or mixing stage. If the coupling agent and filler are added separately to the rubber mix during the rubber/filler mixing or processing stage, it is considered that the coupling agent then combines in situ with the filler. Any coupling agents known to those of skill in the art may be employed in compositions of the present invention. Coupling agents are generally composed of a silane which has a constituent silane component (i.e. moiety) capable of reacting with the silica surface and, also, a constituent component capable of reacting with the rubber, particularly a sulfur-vulcanizable rubber which contains carbon-to-carbon double bonds, or unsaturation. In this manner, the coupler may act as a connecting bridge between the silica and the rubber and thereby enhance the rubber reinforcement aspect of the silica.

The silane of the coupling agent may form a bond to the silica surface, possibly through hydrolysis, and the rubber reactive component of the coupling agent combines with the rubber itself. Usually the rubber reactive component of the coupler is temperature sensitive and tends to combine with the rubber during the final and higher temperature sulfur vulcanization stage. However, some degree of combination or bonding may occur between the rubber-reactive component of the coupler and the rubber during an initial rubber/silica/coupler mixing stage prior to a subsequent vulcanization stage.

The rubber-reactive group component of the coupling agent may be, for example, one or more of groups such as mercapto, amino, vinyl, epoxy, and sulfur groups, preferably a sulfur or mercapto moiety and more preferably sulfur.

Examples of coupling agents include, but are not limited to, a bifunctional sulfur containing organosilane such as, for example, bis-(3-triethoxysilylpropyl)tetrasulfide, bis-(3-trimethoxysilylpropyl)tetrasulfide and bis(3-triethoxysilylpropyl)tetrasulfide grafted silica from DeGussa, A. G. The amount of silica coupling agent which may be used may range from about 0.5 to about 8.5 parts by weight per 100 parts by weight of total rubber used. Preferably, the amount of silica coupler ranges from about 1.0 to about 5.0 parts by weight per 100 parts by weight of rubber used.

The rubber composition may also contain conventional additives in addition to reinforcing fillers, including other fillers, peptizing agents, pigments, stearic acid, accelerators, sulfur vulcanizing agents, antiozonants, antioxidants, processing oils, activators, initiators, plasticizers, waxes, prevulcanization inhibitors, extender oils and the like.

Examples of sulfur vulcanizing agents include, but are not limited to, elemental sulfur (free sulfur) or sulfur donating vulcanizing agents, for example, an amine disulfide, polymeric polysulfide or sulfur olefin adducts. The amount of sulfur vulcanizing agent will vary depending on the type of rubber and particular type of sulfur vulcanizing agent, but generally range from about 0.1 phr to about 5 phr with a range of from about 0.5 phr to about 2 phr being preferred.

Examples of antidegradants that may be in a rubber composition according to various embodiments of the present invention include, but are not limited to, monophenols, bisphenols, thiobisphenols, polyphenols, hydroquinone derivatives, phosphites, phosphate blends, thioesters, naphthylamines, diphenol amines as well as other diary amine derivatives, para-phenylene diamines, quinolines and blended amines. Antidegradants are generally used in an amount ranging from about 0.1 phr to about 10 phr with a range of from about 2 to 6 phr being preferred.

Examples of a peptizing agent include, but are not limited to, pentachlorophenol which may be used in an amount ranging from about 0.1 phr to 0.4 phr with a range of from about 0.2 to 0.3 phr being preferred.

Examples of processing oils include, but are not limited to, aliphatic-naphthenic aromatic resins, polyethylene glycol, petroleum oils, ester plasticizers, vulcanized vegetable oils, pine tar, phenolic resins, petroleum resins, polymeric esters and rosins. A processing oils may be used in an amount ranging from about 0 to about 50 phr with a range of from about 5 to 35 phr being preferred.

An example of an initiator includes, but is not limited to, stearic acid. Initiators may be used in an amount ranging from about 1 to 4 phr with a range of from about 2 to 3 phr being preferred.

Examples of accelerators include, but are not limited to, amines, guanidines, thioureas, thiols, thiurams, disulfides, thiazoles, sulfenamides, dithiocarbamates and xanthates. In cases where only a primary accelerator is used, the amounts used may range from about 0.5 to 2.5 phr. In cases where combinations of two or more accelerators are used, the primary accelerator is generally may be used in amounts ranging from 0.5 to 2.0 phr and a secondary accelerator may be used in amounts ranging from about 0.1 to 0.5 phr. Combinations of accelerators have been known to produce a synergistic effect. Preferably, the primary accelerator is a sulfenamide. If a secondary accelerator is used, it is preferably a guanidine, dithiocarbamate, or thiuram compound.

The rubber compositions according to embodiments of the present invention may be compounded by conventional means known by those having skill in the art, including a Banbury®, mill, extruder, etc. The tires may be built, shaped, molded, and cured by various methods which will also be readily apparent to those having skill in such art.

EXAMPLES

Embodiments of the invention are further illustrated by reference to the following non-limiting examples.

Example 1

Homopolymer of Farnesene Produced by Friedel-Crafts Catalyst in Hydrocarbon Solvent Sample 1 was prepared in a round bottom flask (reactor) with a stirrer that was purged with nitrogen for 30 minutes, 20 g of toluene were added to the reactor and the contents warmed to 25° C.

100 g of β-farnesene (distilled, Amyris) was blended with 100 g of toluene solvent (Sigma-Aldrich) to prepare the monomer feed. 2.3 g of $AlCl_3$ were divided into 3 aliquots of 0.7 g each. An initial charge of 0.7 g $AlCl_3$ (Sigma-Aldrich) was added to the solvent charge. The monomer feed was then continuously fed to the stirred reactor at a fixed rate of 4 ml per minute. $AlCl_3$ was added semi-continuously at the rate of 0.7 g per every 100 g monomer feed. After the last of the monomer feed and catalyst aliquot were added, the reaction mixture was stirred at temperature for an additional 45 minutes. The reaction was then quenched by the addition of 100 g aqueous 2-propanol (25%) (Sigma-Aldrich).

After agitating the mixture, the layers were allowed to separate. The organic phase was isolated and washed once more with the same amount of 25% 2-propanol followed by one wash with distilled water. 0.2 g of tetrakis [methylene-3 (3',5'-di-tert-butyl-4-hydroxyphenyl)propionate]methane (BNX 1010, Mayzo) was added to the washed organic phase in a 3-neck round bottom flask fitted for distillation. The mixture was purged with nitrogen while being heated to 230° C. during which time volatile organics collected. Once the temperature had reached 230° C., the nitrogen was replaced by steam. Oligomeric product and steam condensate were collected until approximately one gram of steam distillate per gram resin product was obtained.

Gel Permeation Chromatography (GPC) was used to determine resin molecular weight. Number average molecular weight was reported based on polystyrene calibration. Glass transition temperatures were calculated using Differential Scanning calorimetry (DSC) and reported from the midpoint of the transition. The characteristics of Sample 1 are provided in Table 1.

Example 2

Homopolymer of Farnesene Produced by Anionic Initiator in Hydrocarbon Solvent

Sample 2 was prepared by transferring 100 g of farnesene β-farnesene (distilled, Amyris) and 200 g of heptane (Sigma-Aldrich) to a dosed reactor with stirring followed by nitrogen purging after dosing the reactor. As the temperature reached 50° C., 13 ml of n-butyllithium (1.6 mol/L, Rockwood Lithium) was injected by using a syringe; the reaction temperature was kept between 50 and 60° C. After 2 hours, excess amount of acetic acid was injected to the polymer solution to neutralize the active chain ends. BHT (Sigma-Aldrich) was added at the reaction mixture at a level of 300 ppm. Formed salts were removed by filtration, and filtrated organic phase was dried by vacuum. The characteristics of Sample 2 are provided in Table 1.

Example 3

Homopolymer of Farnesene Produced by Anionic Initiator in Polar Solvent

Sample 3 was prepared by transferring 100 g of farnesene β-farnesene (distilled, Amyris) and 200 g of MTBE were transferred to a reactor with stirring followed by nitrogen purging after closing the reactor. 13 ml of n-butyllithium (1.6 mol/L) was injected by using a syringe at 20° C.; the reaction was not very exothermic and temperature could be controlled by cooling water. The temperature was kept below 30° C. After 15 min, excess amount of methanol was injected to the polymer solution to neutralize the active chain ends. The polymer solution was transferred to a round bottom flask equipped with a bottom drain and washed with DI water three times. The collected organic phase was dried by steam stripping. The characteristics of Sample 3 are provided in Table 1.

Example 4

Copolymer of Farnesene and Alpha-Methyl Styrene Produced by Friedel-Crafts Catalyst in Hydrocarbon Solvent Sample 4 was prepared in a round bottom flask (reactor) with stirrer that was purged with nitrogen for 30 minutes. 20 g of toluene were added to the reactor and the contents warmed to 35° C. 56.9 g of β-farnesene and 3.0 g of α-methyl styrene (Sigma-Aldrich) were blended with 40.0 g of toluene solvent to prepare the monomer feed. 0.9 g of $AlCl_3$ were divided into 2 aliquots of 0.45 g each. An initial charge of 0.45 g $AlCl_3$ was added to the solvent charge. The monomer feed was then continuously fed to the stirred reactor at a fixed rate of 2 ml per minute. When 100 mL of the feed had been added, the second 0.45 g aliquat of $AlCl_3$ was added. After the last of the monomer feed was added, the reaction mixture was stirred at temperature for an additional 45 minutes. The reaction was then quenched by the addition of 50 g aqueous 2-propanol (25%). After agitating the mixture, the layers are allowed to separate. The organic phase was isolated and washed once more with the same amount of 25% 2-propanol followed by one wash with distilled water. 0.2 g of tetrakis [methylene-3 (3',5'-di-tert-butyl-4-hydroxyphenyl)propionate]methane (BNX 1010, Mayzo) was added to the washed organic phase in a 3-neck round bottom flask fitted for distillation. The mixture was purged with nitrogen while being heated to 230° C. during which time volatile organics were collected. Once the temperature has reached 230° C., the nitrogen was replaced by steam. Oligomeric product and steam condensate were collected until approximately one gram of steam distillate per gram resin product was obtained. The characteristics of Sample 4 are provided in Table 1.

Example 5

Copolymer of Farnesene and Styrene Produced by Friedel-Crafts Catalyst in Hydrocarbon Solvent Sample 5 was prepared in a round bottom flask (reactor) with stirrer that was purged with nitrogen for 30 minutes. 10 g of toluene were added to the reactor and the contents warmed to 35° C. 45.4 g of β-farnesene and 4.6 g of styrene were blended with 50.4 g of xylene solvent to prepare the monomer feed. 0.9 g of $AlCl_3$ were divided into 2 aliquots of 0.45 g each. An initial charge of 0.45 g $AlCl_3$ were added to the solvent charge. The monomer feed was then continuously fed to the stirred reactor at a fixed rate of 4 ml per minute. When 100 mL of the feed had been added, the second 0.45 g aliquot of $AlCl_3$ was added. After the last of the monomer feed was added, the reaction mixture was stirred at temperature for an additional 45 minutes. The reaction was then quenched by the addition of 50 g aqueous 2-propanol (25%). After agitating the mixture, the layers were allowed to separate. The organic phase was isolated and washed once more with the same amount of 25% 2-propanol followed by one wash with distilled water. 0.02 g of tetrakis [methylene-(3', 5'-di-tert-butyl-4-hydroxyphenyl)proprionate]methane (BNX 1010, Mayzo) was added to the washed organic phase in a 3-neck round bottom flask fitted for distillation. The mixture was purged with nitrogen while being heated to 230° C. during which time volatile organics were collected. Once the temperature has reached 230° C., the nitrogen was replaced by steam. Oligomeric product and steam condensate were collected until approximately one gram of steam distillate per gram resin product was obtained. The characteristics of Sample 5 are provided in Table 1.

Example 6

Terpolymer of Farnesene, Alpha-Methyl Styrene, and Styrene Produced by Friedel-Crafts Catalyst in Hydrocarbon Solvent Sample 6 was prepared in a round bottom flask (reactor) with stirrer that was purged with nitrogen for 30 minutes, 10 g of xylene were added to the reactor and the contents cooled to 2° C. 12.5 g of β-farnesene, 18.8 g styrene, and 84.0 g of α-methyl styrene were blended with 116 g of xylene solvent to prepare the monomer feed. The monomer feed was then continuously fed to the stirred reactor at a fixed rate of 4 ml per minute, $BF_3$ etherate (Sigma-Aldrich) was added continuously at the rate of 0.55 ml per hour. After the last of the monomer feed and catalyst were added, the reaction mixture was stirred at temperature for an additional hour. The reaction mixture was quenched by the addition of 100 g of 5% aqueous NaOH. After agitating, the layers were allowed to separate. The organic phase was isolated and washed once more with the same amount of 5% NaOH followed by one wash with distilled water. 0.2 g of tetrakis [methylene-3 (3',5'-di-tert-butyl-4-hydroxyphenyl)propionate]methane (BNX 1010, Mayzo) was added to the washed organic phase in 3-neck round bottom flask fitted for distillation. The mixture was purged with nitrogen while being heated to 230° C. during which time volatile organics were collected. Once the temperature has reached 230° C., the nitrogen purge was replaced by steam. Oligomeric product and steam condensate were collected until approximately one gram of steam distillate per gram resin product was obtained. The characteristics of Sample 6 are provided in Table 1.

TABLE 1

|  | Sample 1 | Sample 2 | Sample 3 | Sample 4 | Sample 5 | Sample 6 |
| --- | --- | --- | --- | --- | --- | --- |
| Initiator | $AlCl_3$ | n-BuLi | n-BuLi | $AlCl_3$ | $AlCl_3$ | $BF_3$ etherate |
| Farnesene (mol %) | 100 | 1.00 | 100 | 92 | 83 | 6 |
| AMS (mol %) |  |  |  | 8 |  | 75 |
| Styrene (mol %) |  |  |  |  | 17 | 19 |
| Tg (° C.) | 63 | −75 | −70 | 51 | 69 | 71 |
| Mn | 1008 | 11600 | 10600 | 801 | 901 | 1028 |

Example 7

Rubber Compositions Prepared from Samples 1-6

Rubber compositions were prepared by mixing elastomers, fillers, resins, other processing aids and protectants, and curatives in a 3-stage process to form rubber compounds using standard laboratory equipment and processes.

A 350 cc banbury-style internal mixer was used to prepare the compounds according to the recipes outlined in Table 2. All amounts are in parts per hundred rubber (phr), During the first stage mix, after the addition of the last ingredient, the compound was heated to 165° C.-170° C. and held for 5 minutes, then removed. During the second stage mix, stearic acid and an antioxidant were added to the compound from the first stage and the new compound was mixed for 3 minutes at 120° C. During the third and final stage, the curatives were added to the compound from the previous stage, and mixed for 3 minutes at 100° C. The compounds were passed on a two-roll mill between stages and prior to curing.

The compounds were allowed to cool prior to further processing. An oscillating die rheometer was used to determine extent of cure and cure kinetics according to ASTM D 2084. The cure temperature used was 160° C., using an arc deflection of 3° C., Rubber compounds 1-6 were then cured into standard test pieces at 160° C. in a press to t90 times (time to 90% of maximum torque). Tensile data was acquired on a tensile tester following ASTM D 412. A Dynamic Mechanical Analyzer (DMA 2980, TA instruments) was operated in tension to obtain temperature sweeps of the cured vulcanizates from −100° C. to 100° C. at 11 Hz and 0.1% strain amplitude. From this data, tangent delta at 0° C. and 60° C. were reported. Pendulum rebound data at room temperature and 100° C. was also tested according to ASTM 1054.

Rebound at room temperature (RT) and tangent delta at 0° C. are laboratory measurements commonly used to measure the traction of tire tread compounds. Lower rebound at room temperature and higher tangent delta at 0° C. indicate improved traction. The farnesene-containing resins prepared from Friedel-Crafts catalysts (Compounds 1, 4-6) demonstrate superior room temperature rebound and tangent delta at 0° C. properties compared to the resins prepared from anionic initiation (Compounds 2, 3).

Rebound at elevated testing temperature (100° C.) and tangent delta at 60° C. are laboratory measurements commonly used to measure the hysteresis component of tire tread compounds. Higher rebound at elevated temperatures and lower tangent delta at 60° C. indicate lower hysteresis. The farnesene-containing resins prepared from Friedel-Crafts catalysts (Compounds 1, 4-6) demonstrate superior high temperature rebound and tangent delta at 60° C. properties compared to the resins prepared from anionic initiation (Compounds 2, 3).

TABLE 2

|  |  | Compound 1 | Compound 2 | Compound 3 | Compound 4 | Compound 5 | Compound 6 |
|---|---|---|---|---|---|---|---|
| Stage 1 | cis-BR | 25.0 | 25.0 | 25.0 | 25.0 | 25.0 | 25.0 |
|  | High Vinyl SSBR | 75.0 | 75.0 | 75.0 | 75.0 | 75.0 | 75.0 |
|  | Silica | 65.0 | 65.0 | 65.0 | 65.0 | 65.0 | 65.0 |
|  | Silane | 10.4 | 10.4 | 10.4 | 10.4 | 10.4 | 10.4 |
|  | Sample 1 | 15.0 |  |  |  |  |  |
|  | Sample 2 |  | 15.0 |  |  |  |  |
|  | Sample 3 |  |  | 15.0 |  |  |  |
|  | Sample 4 |  |  |  | 15.0 |  |  |
|  | Sample 5 |  |  |  |  | 15.0 |  |
|  | Sample 6 |  |  |  |  |  | 15.0 |
| Stage 2 | Stearic Acid | 1.0 | 1.0 | 1.0 | 1.0 | 1.0 | 1.0 |
|  | IPPD | 2.0 | 2.0 | 2.0 | 2.0 | 2.0 | 2.0 |
| Stage 3 | ZnO | 2.5 | 2.5 | 2.5 | 2.5 | 2.5 | 2.5 |
|  | CBS | 1.7 | 1.7 | 1.7 | 1.7 | 1.7 | 1.7 |
|  | Sulfur | 1.4 | 1.4 | 1.4 | 1.4 | 1.4 | 1.4 |
|  | DPG | 2.0 | 2.0 | 2.0 | 2.0 | 2.0 | 2.0 |

Poly(butadiene) (cis-BR, Buna BR23) and solution poly(styrene-co-butadiene) (SSBR, PBR VSL 4041-0 HM) were produced by Lanxess Corporation. Precipitated silica (ZS 1165MP) was acquired from Rhodia. The silane coupling agent used, Z-6945 (50% active on carbon black) was supplied by Dow Corning. N-isopropyl-N'-phenyl-p-phenylenediamine (Santoflex IPPD) antioxidants and the accelerators N-cyclohexylbenzothiazole-2-sulfenamide (Santocure CBS) and diphenylguanidine (Perkacit DPG are commercial products of Flexsys America L.P. Rubbermaker's sulfur was provided by International Sulphur Inc. Zinc oxide and stearic acid were supplied from Sigma-Aldrich Co., LLC.

Table 3 contains the results from the physical testing of the cured Compounds 1-6.

Therefore, the data demonstrates that low molecular weight farnesene-containing resins prepared from Friedel-Crafts catalysts can be used to prepare rubber compounds for tire applications which provide improved performance balances.

While preferred embodiments of the invention have been shown and described herein, it will be understood that such embodiments are provided by way of example only. Numerous variations, changes, and substitutions will occur to those skilled in the art without departing from the spirit of the invention. Accordingly, it is intended that the appended claims cover all such variations as fall within the spirit and scope of the invention.

TABLE 3

|  | Compound 1 | Compound 2 | Compound 3 | Compound 4 | Compound 5 | Compound 6 |
|---|---|---|---|---|---|---|
| 100% Modulus (dNm) | 290 | 228 | 235 | 313 | 300 | 328 |
| Rebound RT (%) | 22.6 | 40.4 | 38.1 | 22.1 | 20.8 | 19.4 |
| Rebound 100C (%) | 62.3 | 61.8 | 60.0 | 62.9 | 62.9 | 62.9 |
| Tangent delta 0° C. | 0.720 | 0.417 | 0.434 | 0.653 | 0.672 | 0.656 |
| Tangent delta 60° C. | 0.130 | 0.141 | 0.143 | 0.135 | 0.131 | 0.135 |

We claim:

1. A rubber composition comprising at least one elastomer selected from synthetic and natural elastomers, a filler, and a farnesene polymer having a Tg greater than zero degrees Celsius,
   the farnesene polymer made according to a method comprising
   combining a farnesene monomer and a solvent and optionally adding one or more comonomers selected from the group consisting of vinyl aromatics, to provide a monomer feed, and
   polymerizing the monomer feed by combining the monomer feed with a Friedel-Crafts catalyst in a vessel.

2. The rubber composition of claim 1, wherein polymerizing the monomer feed comprises continuously feeding both the monomer feed and the Friedel-Crafts catalyst to the vessel.

3. The rubber composition of claim 1, wherein the Friedel-Crafts catalyst is selected from the group consisting of $BF_3$, $AlCl_3$, $SnCl_4$, and $TiCl_3$.

4. The rubber composition of claim 1, wherein the Friedel-Crafts catalyst is at least one of $AlCl_3$ and $BF_3$.

5. The rubber composition of claim 4, wherein the monomer feed includes 0 to 50 mol. % of the comonomer based on the total moles of monomer.

6. The rubber composition of claim 4, wherein the monomer feed includes 0 to 25 mol. % of the comonomer based on the total moles of monomer.

7. The rubber composition of claim 1, wherein the Friedel-Crafts catalyst is $BF_3$.

8. The rubber composition of claim 7, wherein the monomer feed comprises at least 75 mol. % of the comonomer based on the total moles of monomer.

9. The rubber composition of claim 7, wherein the monomer feed comprises at least 90 mol. % of the comonomer based on the total moles of monomer.

10. The rubber composition of claim 1, wherein the farnesene polymer has a number average molecular weight of 400 to 10,000 g/mol.

11. The rubber composition of claim 1 comprising 1-50 parts of the farnesene polymer per 100 parts of the at least one elastomer.

12. The rubber composition of claim 1 comprising 5-25 parts of the farnesene polymer per 100 parts of the at least one elastomer.

13. A tire comprising at least one component made of a rubber composition according to claim 1.

14. A farnesene polymer comprising monomeric units derived from a farnesene monomer and one or more optional comonomers selected from the group consisting of vinyl aromatics, wherein the polymer has a Tg greater than zero degrees Celsius.

15. The farnesene polymer of claim 14, wherein the farnesene polymer comprises 0 to 90 mol % of the comonomer.

16. The farnesene polymer of claim 14, wherein the farnesene polymer comprises at least 75 mol % of the comonomer.

17. The farnesene polymer of claim 14, wherein the farnesene polymer comprises at least 90 mol % of the comonomer.

18. The farnesene polymer according to claim 14, wherein the comonomer is selected from the group consisting of styrene, alpha-methyl styrene, 2-methyl styrene, 3-methyl styrene, 4-methyl styrene, 4-t-butyl styrene, 4-cyclohexyl styrene, 4-dodecyl styrene, 2,4-diisopropyl styrene, 2,4,6-trimethyl styrene, 2-ethyl-4-benzyl styrene, 4-(phenyl butyl) styrene, 1-vinyl naphthalene, 2-vinyl naphthalene, vinyl anthracene, 4-methoxy styrene, monochlorostyrene, dichlorostyrene, divinyl benzene, Indene, methyl-Indene, and mixtures thereof.

19. The farnesene polymer according to claim 14 having a number average molecular weight of 400 to 10,000 g/mol.

20. A rubber composition comprising at least one elastomer selected from synthetic and natural elastomers, a filler, and a farnesene polymer according to claim 14.

21. The rubber composition of claim 20 comprising 5-25 parts of the farnesene polymer per 100 parts of the at least one elastomer.

22. A tire comprising at least one component made of a rubber composition according to claim 20.

* * * * *